US007295615B1

(12) United States Patent
Kamijo et al.

(10) Patent No.: US 7,295,615 B1
(45) Date of Patent: Nov. 13, 2007

(54) SYSTEM FOR EMBEDDING ADDITIONAL INFORMATION IN VIDEO DATA, AND EMBEDDING METHOD

(75) Inventors: Koichi Kamijo, Yokohama (JP);
Shuichi Shimizu, Yokohma (JP);
Norishige Morimoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/763,988

(22) PCT Filed: Nov. 25, 1998

(86) PCT No.: PCT/JP98/05355

§ 371 (c)(1),
(2), (4) Date: Jul. 5, 2001

(87) PCT Pub. No.: WO00/13414

PCT Pub. Date: Mar. 9, 2000

(30) Foreign Application Priority Data

Aug. 27, 1998 (JP) ................... 10/241493

(51) Int. Cl.
*H04N 7/12* (2006.01)
(52) U.S. Cl. .................. 375/240.26
(58) Field of Classification Search ........... 375/240.01, 375/240.18, 240.2, 240.23, 240.24, 240.26; 380/217; 382/232; 386/52; *H04N 7/12*
See application file for complete search history.

(56) References Cited

U.S. PATENT DOCUMENTS 5,809,139 A * 9/1998 Girod et al. ............... 380/217

(Continued)

FOREIGN PATENT DOCUMENTS

JP 11-088851 9/1997

OTHER PUBLICATIONS

F. Hartung et al., "Digital Watermarking of MPEG-2 Coded Video in the Bitstream Domain", 1997 IEEE Int'l Conf. on Acoustics, Speech, and Signal Processing, vol. 4, Apr. 21, 1997, pp. 2621-2624.

(Continued)

*Primary Examiner*—Young Lee
(74) *Attorney, Agent, or Firm*—Ference & Associates LLP

(57) ABSTRACT

It is one object of the present invention to provide a method and system for embedding an electronic watermark directly in an MPEG stream. An intra-macroblock of an I-frame or of a P or B-frame is detected in an MPEG stream, and following the detection of an intra-macroblock of the I-frame or of the P or B-frame, data for one macroblock are extracted from the MPEG stream and buffered. An embedding pattern is embedded in the buffered macroblock without changing the length of VLC, and the resultant macroblock is returned to the MPEG stream. More specifically, a DC factor is extracted from the buffered macroblock, and a pseudorandom number is generated to produce an embedding pattern. Then, whether the bit length of the DC factor will not be changed by embedding the obtained embedded pattern is determined. When the bit length of the DC factor not be changed, the embedding pattern is embedded in the buffered macroblock. When the bit length will be changed, whether ½ of the embedding pattern can be embedded is determined. If possible, ½ of the embedded pattern is embedded in the macroblock.

9 Claims, 5 Drawing Sheets

U.S. PATENT DOCUMENTS 6,104,826 A     8/2000  Nakagawa et al.
6,185,312 B1 *  2/2001  Nakamura et al. .......... 382/232
6,393,196 B1 *  5/2002  Yamane et al. ............... 386/52
6,799,246 B1 *  9/2004  Wise et al. .................. 711/217

OTHER PUBLICATIONS

I.J. Cox et al., "Secure Spread Spectrum Watermarking for Images, Audio and Video", Proc. of the Int'l Conf on Image Processing, vol. 2, Sep. 16, 1996, New York, IEEE, pp. 243-246.

Ogawa et al., "A Copyright Information Embedding Method Using DCT for Digital Movies", The 1997 Symposium on Cryptography and Information Security, Fukuoka, Japan Jan. 29, 1997-Feb. 1, 1997.

Nikkei Multimedia, May 1998, article entitled Technology Finder, pp. 76-81.

* cited by examiner

Fig. 1

| Len(x) | Variable length code | dct_dc_size_luminance | Change in DC |
|---|---|---|---|
| 3 | 100 | 0 | ±0 |
| 3 | 00 | 1 | ±1 |
| 4 | 01 | 2 | ±2,3 |
| 6 | 101 | 3 | ±4, ... ,7 |
| 7 | 110 | 4 | ±8, ... ,15 |
| 9 | 1110 | 5 | ±16, ... ,31 |
| 11 | 1111 0 | 6 | ±32, ... ,63 |
| 13 | 1111 10 | 7 | ±64, ... ,127 |
| 15 | 1111 110 | 8 | ±128, ... ,255 |
| 17 | 1111 1110 | 9 | ±256, ... ,511 |
| 19 | 1111 1111 0 | 10 | ±512, ... ,1023 |
| 20 | 1111 1111 1 | 11 | ±1024, ... ,2047 |

Fig. 3

SYSTEM FOR EMBEDDING ADDITIONAL INFORMATION IN VIDEO DATA, AND EMBEDDING METHOD

BACKGROUND OF THE INVENTION

1. Field of the Invention

The present invention relates to a technique for the embedding of additional information in a video data stream, and in particular to a method and a system for electronically embedding information in MPEG2 video data without changing the length of the VLC (Variable Length Code) that constitutes the MPEG video data portion.

2. Background Art

The data hiding technique (trademark of IBM) is known as a technique for embedding invisible and inseparable data in still picture data, and moving picture data or audio data. This technique is also called electronic watermarking and has received attention as a technique that can be used to protect copyrights for the contents of multimedia applications. Recently, since digital data have come to be widely employed for moving pictures which have in turn been widely distributed, and since the need for copyright protection has increased for the high value added contents of such applications as movies, the use of data hiding for the control of copying and replaying has been discussed. For embedding additional information in a digital image, generally the information is embedded in a baseband and then JPEG/MPEG compression is performed on the resultant data Here it should be noted that JPEG is used to represent the Joint Photographic Coding Experts Group, and that MPEG is used to represent the Moving Picture Experts Group.

An electronic watermarking technique for still picture data, moving picture data or audio data is disclosed in, for example, Japanese Patent Application No. Hei 8-159330, Japanese Patent Application No. Hei 8-273551, Japanese Patent Application No. Hei 8-348426, Japanese Patent Application No. Hei 9-088493, Japanese Patent Application No. Hei 9-248272, and Japanese Patent Application No. Hei 8-272721. In all the cited prior art, embedding of image data in a baseband is assumed. Even for the embedding of the data contents that are compressed by JPEG/MPEG, generally the data are embedded in the baseband and then the resultant data are compressed, and the data are not directly embedded in a MPEG2 video data stream. This is because the length of the VLC (Variable length Code) would be changed by directly embedding image data in a compressed MPEG2 video data stream, and thus a content packet can not be coped with.

More specifically, since an AC or DC factor is changed using the VLC, the dermultiplexing and the multiplexing of the VLC is required before and after the embedding process. so that the entire length of a bit stream is changed. Therefore, a large buffer is required and reconstruction of the bit stream is difficult. Particularly when DVD data are formed into a packet having a fixed length. the reconstruction of the packet is very difficult. Proposed in Japanese Patent Application No. Hei 8-272721 is a method for directly embedding data in a MPEG2 domain using the forward prediction and backward prediction for a B or P frame. This method also has the same shortcomings in that the length of the VLC is changed and moving picture data having a few B or P es can not be coped with.

PROBLEMS TO BE SOLVED BY THE INVENTION

It is, therefore, one object of the present invention to provide a method and system for embedding additional information directly in video data.

It is another object of the present invention to provide a method and system for embedding additional information in a packet of video data.

It is an additional object of the present invention to provide a method and system for embedding additional information in MPEG data without changing the length of the VLC.

It is a further object of the present invention to provide a method and system for embedding additional information in a video data stream without changing the overall length of the video data stream.

It is still another object of the present invention to provide a method and system for embedding additional information in video data without a large buffer being required.

It is a still additional object of the present invention to provide a method and a system, for embedding an electronic watermark in MPEG data, that can cope with a moving picture having a few B or P frames.

SUMMARY OF THE INVENTION

To achieve the above objects, to embed additional information in video data, first a video frame is detected in the video data, and data in a small domain are extracted from the detected video frame and buffered. Additional information is embedded in the buffered small domain without changing the length of the video data stream, and the resultant small domain is returned to the video data.

As for MPEG video data, an intra-macroblock of an I-frame or of a P or B-frame is detected in an MPEG stream and following the detection of an intra-macroblock of the I-frame or of the P or B-frame, data for one macroblock are extracted from the MPEG stream and buffered. An embedding pattern is embedded in the buffered macroblock without changing the length of VLC, and the resultant macroblock is returned to the MPEG stream. More specifically, a DC factor is extracted from the buffered macroblock, and a pseudorandom number is generated to produce an embedding pattern. Then, whether the bit length of the DC factor will not be changed by embedding the obtained embedded pattern is determined. When the bit length of the DC factor not be changed, the embedding pattern is embedded in the buffered macroblock. When the bit length will be changed, whether ½ of the embedding pattern can be embedded is determined. If possible, ½ of the embedded pattern is embedded in the macroblock.

DESCRIPTION OF THE PREFERRED EMBODIMENTS

To detect additional information in video data, first, a video frame is detected in video data, and data in a small domain are extracted from the detected video frame and buffered. Then, the additional information in the buffered small domain is detected. To detect an electronic watermark in an MPEG stream, first, an intra-macroblock of an I-frame or of a P or B-frame is detected. When the intra-macroblock of an I-frame or of a P or B-frame is detected, data for one macroblock are extracted from the MPEG stream and buffered. An embedding pattern that is generated using a pseudorandom number is detected in the DC factor in the buffered macroblock. It should be noted that the pseudorandom number used for embedding and detection is generated by using a common secret key M.

With this arrangement, additional information can be embedded in the video data or can be detected therein without changing the size of a data stream. In addition, additional information can be embedded by an inexpensive method that does not require a high-cost process such as DCT calculation. Since only a small buffer is required, accordingly, any delay is small. Further, this method can be applied to a packetized MPEG2 stream.

Preferred Embodiment

An explanation will be given for the preferred embodiment wherein the method of the present invention is employed to embed additional information in MPEG video data. A system for embedding/detecting additional information in an MPEG2 stream mainly comprises two components: an embedding apparatus, and a detection apparatus. The embedding apparatus and the detection apparatus employ a common secret key M. A detailed explanation will be given below for these two apparatuses.

Embedding Apparatus

First, an embedding method will be explained. In this invention, as is shown in FIG. 1, there are four embedding patterns (P0, P1, P2 and P3), which are embedded as macroblock (16×16 pixels) units in a DC luminance factor of MPEG2 video data. For example, to embed P0, the DC factor for Y0 of the luminance factor of the macroblock is incremented by 1, the DC factor for Y1 is decremented by one, and the DC factors for Y2 and Y3 are unchanged. A P that corresponds to each macroblock is obtained using a pseudorandom number $M(i,j)$. That is, embedding pattern P, which is allocated for slice_number=i(0 origin) and macroblock_number=j, is obtained as $P=PM(i,j)$. Further, for MPEG2, the DC factor that is actually changed in the MPEG2 domain is $\Delta(M(i,j),Y)$ because of a difference in the luminance factors in the preceding sub-block (Y0 for Y1 and Y3 in the preceding macroblock for Y0). The embedding processing will now be described while referring to the flowchart in FIG. 2.

First at step 100, an intra-macroblock of an I-frame or of a P or B-frame is detected. When an MPEG2 video stream is detected in a data stream and the intra-macroblock of the I-frame or of the P or B-frame is detected, program control moves to step 200.

At step 200 data for one macroblock are buffered. Of the bit stream for one macroblock, the portion extending from the DC factor for Y0 to the DC factor for Y3 is stored. At steps 300 and 400, the bit lengths for DDSL Variable length code)+DDD (dct_dc_size_luminance) before and after the embedding process are calculated. When the bit lengths are equal, i.e., when for Y=0.1, 2, 3 the following equation is established, $$Len(D(i,j,Y))=(Len(D(i,j,Y)+\Delta(M(i,j),Y)) \quad (1),$$

$PM(i,j)$ is embedded in the macroblock. $D(i,j,Y)$ represents a difference in DC factors when slice_num=i, macroblock_num=j, and subblock_num=Y; $A(k,Y)$ represents the increase in the factor difference between the embedding pattern k and Y; and $Len(x)$ represents the bit length of DDSL+DDD when the DC factor difference is x. $Len(x)$ is shown in FIG. 3. The subblock in which $Len(0)=Len(1)=3$ and the DC factor difference is "0" can be changed to "1" or "−1" because the bit length w111 not be changed. However, the subblock having the DC factor difference of "4" can not be changed to "3" because the bit length will be changed. When equation (1) is not established, program control moves to step 500.

When the embedding can not be performed because the bit Length differs before and after the embedding, at steps 500 to 700, whether half of the quantity of information can be embedded is determined. If possible, half of the quantity of information is embedded. That is, when P1 in FIG. 1 can not be embedded, whether or not P'$_1$ or P"$_1$ can be embedded is determined. If either P'$_1$ or P$\Delta_1$ can be embedded, it is embedded. In other words, when for Y=0, 1, 2,3 the following equation is established, $$Len(D(i,j,Y))=Len(D(i,j,Y)+\Delta'(M(i,j),Y)) \text{ or}$$

$$Len(D(i,j,Y))=Len(D(i,j,Y)+\Delta''(M(i,j),Y)) \quad (2),$$

P'M(i,j) or P"M(i,j) is embedded in the macroblock $\Delta'(K,Y)$ and $\Delta''(K,Y)$ are increases in the factor difference between the embedding pattern K at Y for P'$_X$ and P"$_X$. When equation (2) is not established, program control moves to step 700, whereat the macroblock embedding is abandoned. At step 800 a check is performed to determine whether the intra-macroblock of the I-frame or of the P or B-frame has been processed. When the process has not been completed, program control returns to step 200.

FIG. 4 is a block diagram illustrating the arrangement of the embedding apparatus. An input controller 100 receives data from a data bus, such as an ATA, and stores them in a line buffer 200. The line buffer 200 is used to store data received by the input controller 100. An intra-macroblock detector 300 for an I-frame or for a P or B-frame detects an MPEG2 video stream in data stored in the line buffer 200, and further detects an intra-macroblock for an I-frame or for a P or B-frame. A CCI detector 400 is used only when the present invention is mounted in a data hiding detection chip (DataHiding™ detection chip), and detects the CCI after the I-frame is detected by the intra-macroblock detector 300. The CCI detector 400 detects the CCI and issues an interrupt to a CPU. The above described blocks 100 to 400 function as the data hiding detection chip.

A macroblock buffer 500 is used to store data for one macroblock. A DC luminance factor detector 600 detects a DC luminance factor (Y=0.1.2,3) in a macroblock. A pseudorandom number generator 700 generates a pseudorandom number ($M(i,j)$) for an embedding pattern. Two bits are allocated for one macroblock For MP@ML (720×480), 720/16*480/16*2=2700 bits are generated. A DC huffman table 800 (Table B.12 for ISO/IEC 31818-2) is used to store a DC luminance factor for MPEG2. A DC huffman length comparator 900 determines whether or not the bit length of DDSL+DDD for the DC luminance factor will be changed by embedding data A DC re-embedding unit 1000 embeds a pattern that is obtained by the pseudorandom number generator 700 when the comparator 900 determines that the bit length will not be changed. An output controller 1010 returns the obtained macroblock to the bit stream and outputs the resultant bit stream When the output controller 1010 does not perform re-embedding, the data received from the input controller are transmitted unchanged. The above described blocks 500 to 1010 have been newly added to the data hiding detection chip.

Detection Apparatus

The detection processing is performed in the following manner. When an I-frame is detected, assuming that DC(i, j,Y) is defined as a DC luminance factor (i,j and Y being defined in the same manner as for the embedding apparatus), that P(M(i,j),Y) is defined as an embedding value of embedding pattern M(i,j) for Y, and that $$\Delta DC(i,j)=DC(i,j,0)-DC(i,j,1),\ M(i,j)=0$$

$$DC(i,j,0)-DC(i,j,2),\ M(i,j)=1$$

$$DC(i,j,1)-DC(i,j,0),\ M(i,j)=2$$

$$DC(i,j,2)-DC(i,j,0),\ M(i,j)=3.$$

Then, when the embedding is not performed, it is expected that the following expression will be established:

$$\Sigma_i \Sigma_j \Delta DC(i,j)/N \to 0$$

(It should be noted that N represents the number of $\Delta DC(i,j)$s that are employed for the calculation of $\Sigma\Sigma$.) When embedding is performed, the value approaches a specific positive value A:

$$\Sigma i \Sigma j \Delta DC(i,j)/N \to A > 0.$$

When the standard deviation $\sigma$ of $\Delta DC(i,j)$ is $$\sigma^2 = \Sigma i \Sigma j (\Delta DC(i,j) - \langle \Delta DC(i,j) \rangle)^2/N,\ \text{and}$$

when threshold T<z while $$z = \Sigma i \Sigma j \Delta DC(i,j)/(\sigma * N),$$

the embedding is "Yes," and when T≥z, the embedding is "No."

Embodiment

The control of digital video recording and replaying has been discussed by employing the data hiding technique. Of demands from the film business and the public appliance business, the implementation of a system is sought that can permit recording only one time for charge broadcasting via a satellite or a cable (see DVD CPTWG DHSG CFP Ver 1.). A system for controlling the frequencies for the copying of distributed digital data can be proposed as one embodiment of the present invention. This system can be provided by employing the following method.

When a recording device detects CCI=(1,0) (Copy Once) in digital data, an examination is made to determine whether new CCI (extended CCI, hereinafter referred to as ECCI) is present. When the result "ECCI is not present" is obtained, ECCI is embedded and recording is permitted. When the result "ECCI is present" is obtained, recording is not permitted. When the method of the present invention is employed for the embedding and the detection of ECCI the system that permits copying to be performed only once can be provided. FIG. 5 is a flowchart showing example processing performed by a system for the distribution of digital video data.

At step 510 digital video data are received by an STB (Set Top Box). When the data are transmitted to a recording device 570, at step 520 CCI is detected, and when the CCI is detected, at step 530 whether or not ECCI is present is determined. When ECCI is present (YES), at step 560 recording is inhibited. When ECCI is not present, at step 540 ECCI is embedded in the video data and at step 550 recording is performed.

The advantages of this system are:

1. ECCI can be embedded in the MPEG2 domain in veal time, and a packet having a DVD format can be coped with;

2. ECCI can be detected even in a baseband after the MPEG2 data have been developed, or in an analog domain for which DA conversion has been performed;

3. ECCI can be embedded directly in the baseband; and 4. the accuracy of the ECCI detection is not deteriorated by the occurrence of an error across a communication path, which is a problem that afflicts the Token method disclosed in Japanese Patent Application No. Hei 9-083493.

ADVANTAGES OF THE INVENTION

According to the present invention, an MPEG electronic watermarking system can be provided whereby the size of a data stream after additional information has been embedded is the same as it was before the additional information was embedded. The method of the present invention can be applied for a packet in an MPEG2 stream, and can also be performed at a low cost, without a high-cost process, such as DCT calculation, being required. Since only a small buffer is required, any delay is accordingly small. In addition, an electronic watermark can be detected even in a baseband image for which MPEG2 data have been developed. Since the information is embedded in the baseband image, the watermark can be directly detected even when MPEG2 compression has been performed for the image data. The method of the present invention does not conflict with the conventional marking technique for an AC factor, and can coexist with it.

BRIEF DESCRIPTION OF THE DRAWINGS

Figure 1:
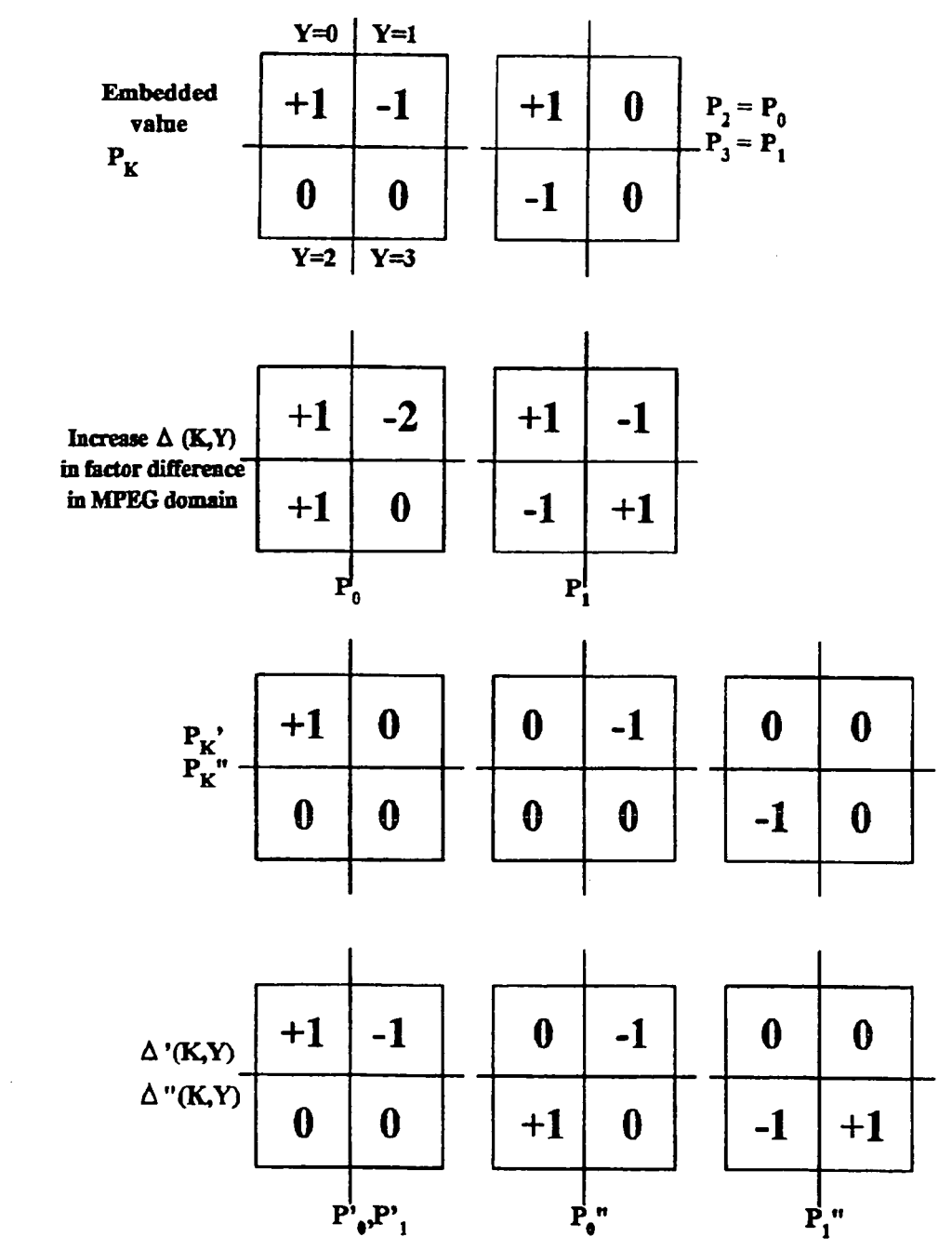

FIG. 1 is a diagram showing example embedding patterns used for the present invention.

FIG. 3 is a table showing example values for Len(x).

Figure 2:
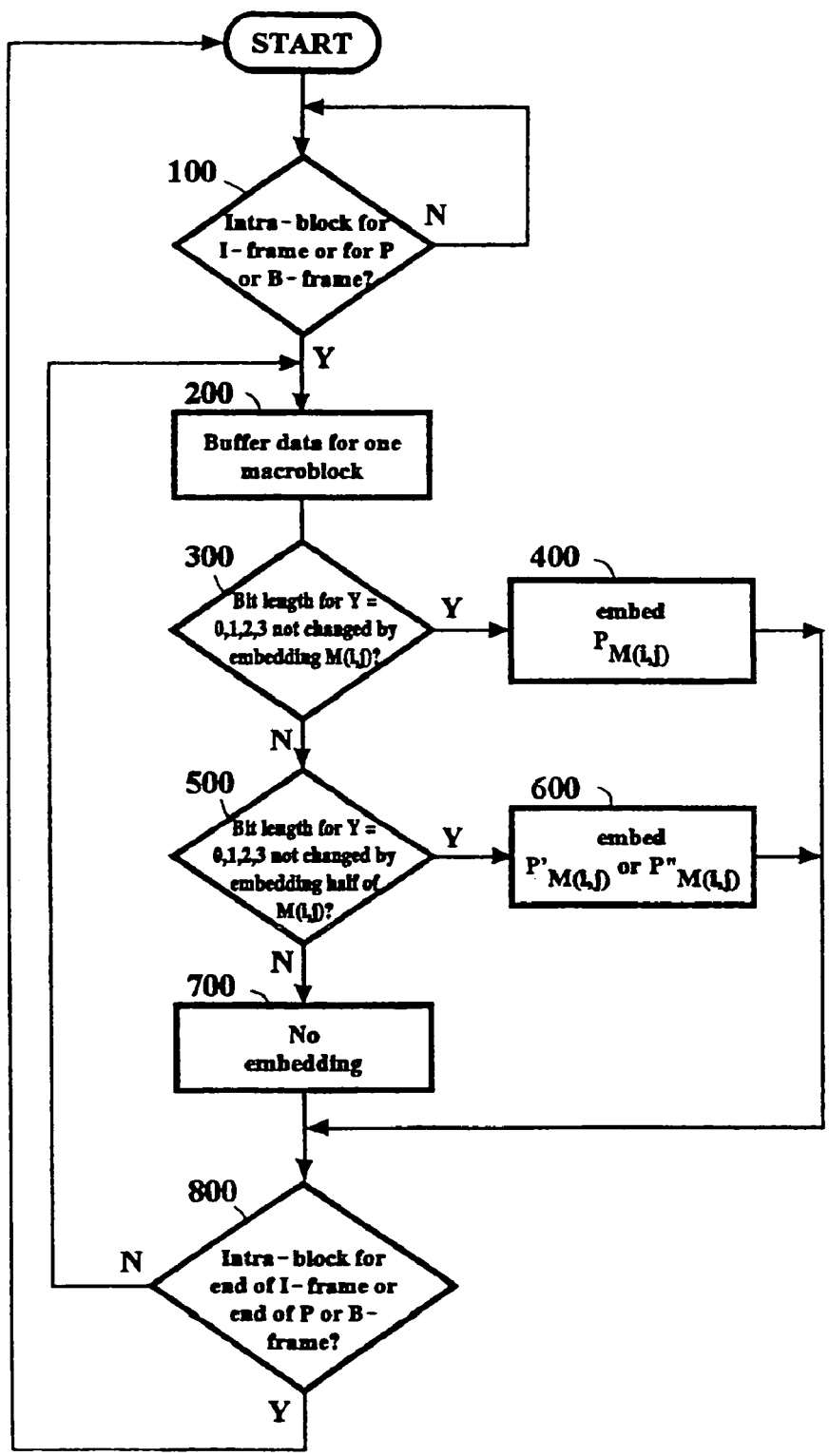
FIG. 2 is a flowchart showing the embedding processing for the present invention.
Figure 4:
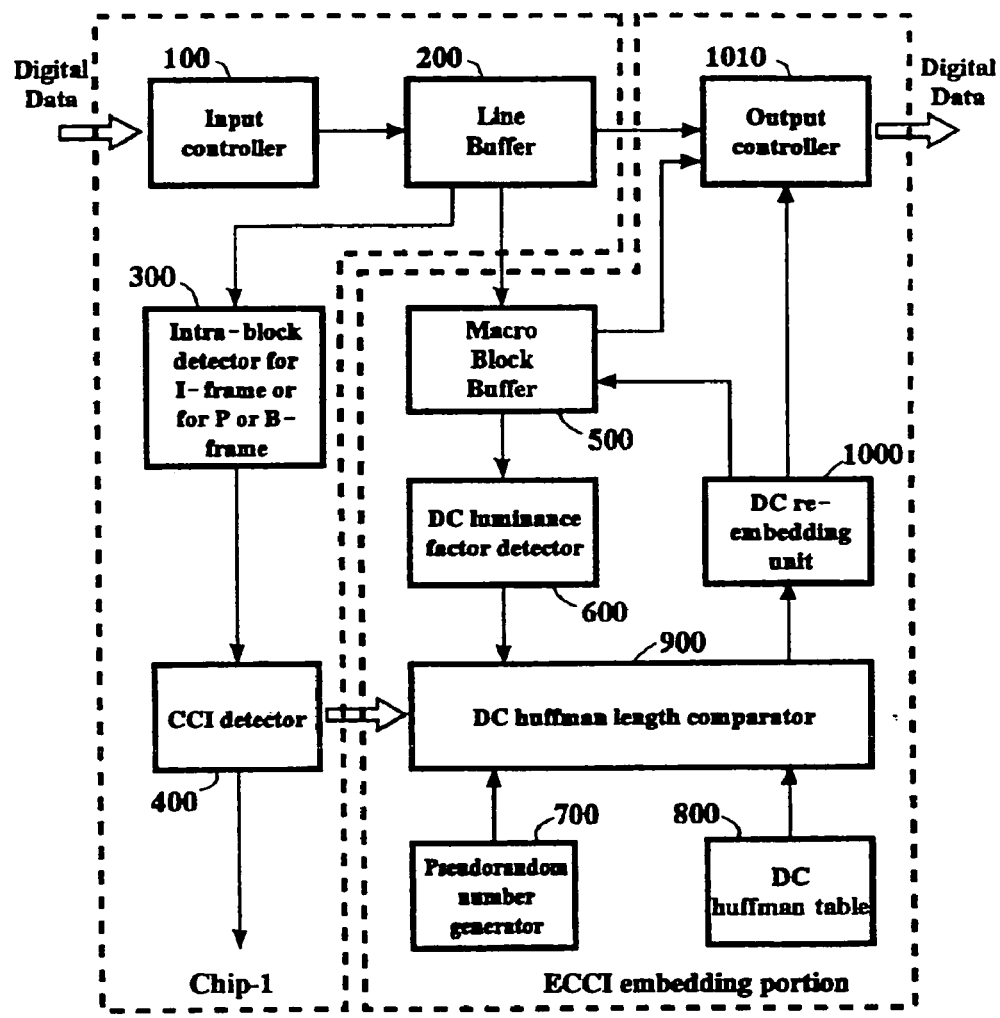
FIG. 4 is a block diagram showing an embedding apparatus according to the present invention.
Figure 5:
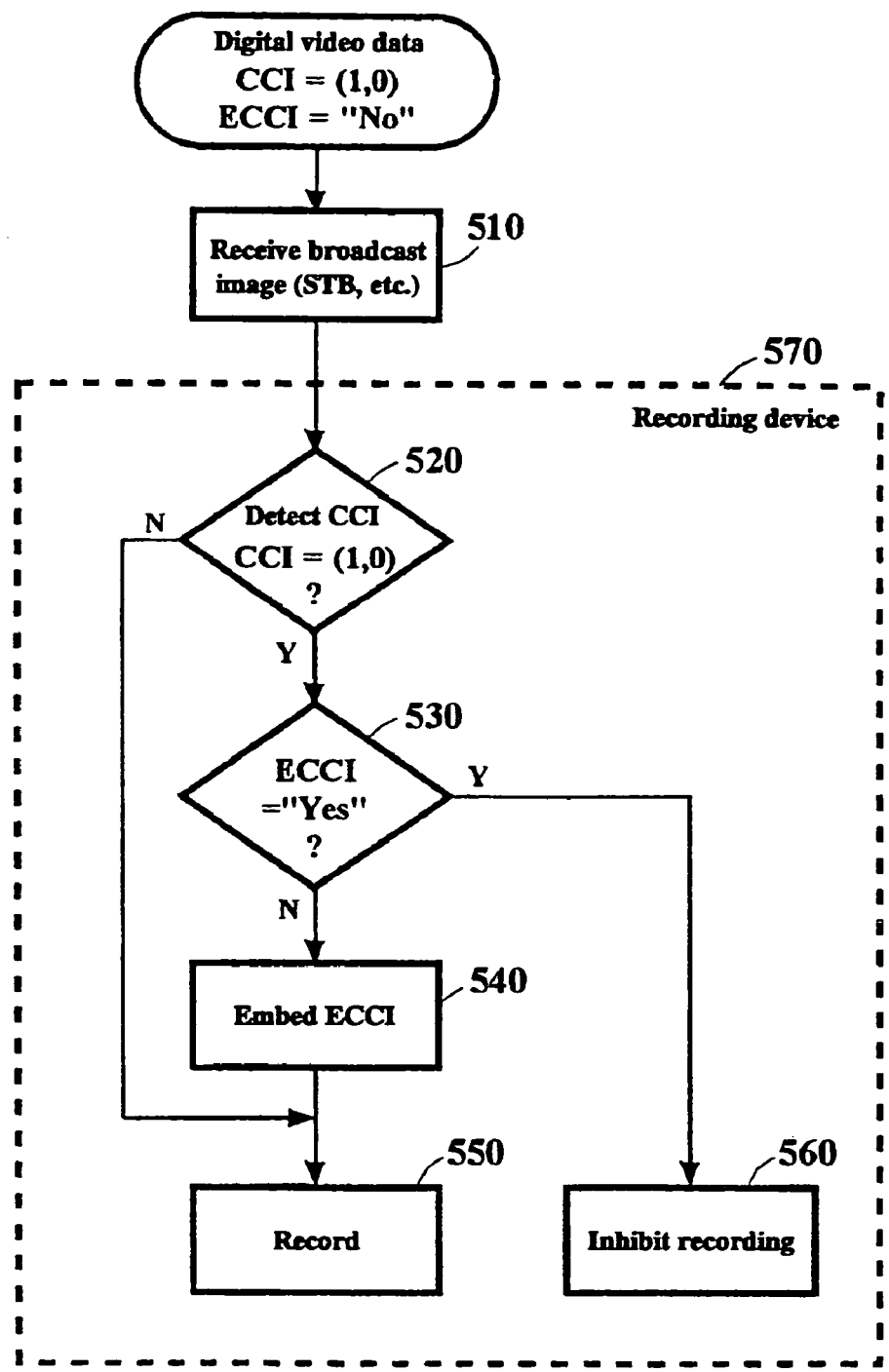
FIG. 5 is a flowchart showing the processing for an example copying control system when the present invention is applied for digital video.

The invention claimed is:

1. A system for embedding additional information in MPEG video data, said system comprising:
    means for detecting a video frame in the video data from a video data stream, wherein said video frame is an intra-macroblock of an I-frame or of a P or B-frame;
    means for extracting data for a small domain from said detected video frame and for buffering said data;
    means for embedding part or all of the additional information into said buffered small domain data without changing the length of the video data stream based on a determination whether the embedding of all the additional information will change the length of the video data stream and where the embedding of all the additional information is determined to change the length of the video data stream, embedding ½ of the additional data if the embedding of ½ does not change the length of the video data stream, wherein said means for embedding said additional information includes:
    means for detecting a DC factor in said buffered small domain:
    means for determining whether the bit length of said DC factor will be unchanged even when said additional information has been embedded,
    means for embedding said additional information in said buffered small domain, when said bit length will be unchanged; and
    means for determining whether ½ of said additional information can be embedded when said bit length will be changed, and for embedding said ½ of said additional information in said small domain when embedding is feasible; and means for returning said small domain, in which said additional information has been embedded, to said video data.

2. The system according to claim 1, wherein said additional information is an embedding pattern obtained using a pseudorandom number.

3. The system according to claim 2, wherein said small domain is one macroblock domain.

4. The system according to claim 1, wherein said MPEG video data is MPEG-2 video data.

5. The system according to claim 4, wherein said MPEG-2 video data is a packetized MPEG-2 video data stream.

6. An apparatus for embedding additional information in MPEG video data comprising:

means for detecting a video frame in the video data from a video data stream, wherein said video frame is an intra-macroblock of an I-frame or a P or B-frame;

means for extracting data for a small domain from said detected video frame and for buffering said data;

means for embedding part or all of the additional information in said buffered small domain data without changing the length of the video data stream based on determination whether the embedding of all the additional information will change the length of the video data stream and where the embedding of all the additional information is determined to change the length of the video data stream, embedding ½ of the additional data if the embedding of ½ does not change the length of the video data stream, wherein said means for embedding additional information includes:

means for detecting a DC factor in said buffered small domain;

means for determining whether the bit length of said DC factor will be unchanged even when said additional information has been embedded;

means for embedding said additional information in said buffered small domain, when said bit length will be unchanged; and means for determining whether ½ of said additional information can be embedded when said bit length will be changed, and for embedding said ½ of said additional information in said small domain when embedding is feasible; and means for returning said small domain, in which said additional information has been embedded, to said video data.

7. The apparatus according to claim 6, wherein said additional information is an embedding pattern obtained using a pseudorandom number.

8. The apparatus according to claim 7, wherein said small domain is one macroblock domain.

9. The apparatus for embedding additional information in video data according to claim 6, wherein said MPEG video data is MPEG-2 video data.

* * * * *